US012714099B2

(12) United States Patent
Okuyama et al.

(10) Patent No.: US 12,714,099 B2
(45) Date of Patent: Aug. 25, 2026

(54) METHOD FOR PRODUCING FRUIT HAVING IMPROVED QUALITY

(71) Applicant: AQUASOLUTION CORPORATION, Nagano (JP)

(72) Inventors: Yuichi Okuyama, Tokyo (JP); Takashi Sato, Tokyo (JP)

(73) Assignee: AQUASOLUTION Corporation, Nagano (JP)

( * ) Notice: Subject to any disclaimer, the term of this patent is extended or adjusted under 35 U.S.C. 154(b) by 861 days.

(21) Appl. No.: 17/605,496

(22) PCT Filed: Apr. 14, 2020

(86) PCT No.: PCT/JP2020/016406
§ 371 (c)(1),
(2) Date: Oct. 21, 2021

(87) PCT Pub. No.: WO2020/226032
PCT Pub. Date: Nov. 12, 2020

(65) Prior Publication Data

US 2022/0211032 A1 Jul. 7, 2022

(30) Foreign Application Priority Data

May 8, 2019 (JP) ................................ 2019-088131

(51) Int. Cl.
*A01N 25/04* (2006.01)
*A01G 22/05* (2018.01)

(52) U.S. Cl.
CPC ............ *A01N 25/04* (2013.01); *A01G 22/05* (2018.02)

(58) Field of Classification Search
CPC ................................ A01N 25/04; A01G 22/05
See application file for complete search history.

(56) References Cited

FOREIGN PATENT DOCUMENTS

| | | | |
|---|---|---|---|
| CN | 108029415 | A | 5/2018 |
| JP | 05-43370 | A | 2/1993 |
| JP | 2000-316381 | A | 11/2000 |
| JP | 5146784 | B2 | 2/2013 |
| JP | 2015-097509 | A | 5/2015 |
| JP | 2016-053004 | A | 4/2016 |
| JP | 2018-069193 | A | 5/2018 |
| TW | M560342 | U | 5/2018 |

OTHER PUBLICATIONS

Wojcik et al. (Impacts of Pre- and Postbloom Sprays of Tryptophan on Calcium Distribution within ‘Red Jonaprince’ Apple Trees and on Fruit Quality), Hortscience vol. 51(12) Dec. 2016.*
Zahedi et al. (The use of nanotechnology to increase quality and yield of fruit crops), J Sci Food Agric 2020; 100: 25-31.*
Extended European Search Report issued in corresponding European Patent Application No. 20801144.5-1105, dated May 30, 2022.
Office action dated Jun. 19, 2024, issued to the corresponding European Patent Application No. 20 801 144.5.
Affinity New Media: “Pure Rain Hose Gun—Watering at Harrod Horticultural”, Jun. 14, 2013 (Jun. 14, 2013), XP093174997, Retrieved from the Internet: URL:https://web.archive.org/web/20130614223933/https://www.harrodhorticultural.com/pure-rain-hose-spray-gun-pid9040.html.
Office Action dated Jan. 3, 2025, issued in corresponding European Patent Application No. 20801144.5, 9 pages.
He, H. et al., “Researh on the Feasibility of Spraying Micro/Nano Bubble Ozonated Water for Airborne Disease Prevention”, Ozone: Science and Engineering, vol. 37, No. 1, Jan. 2, 2015, pp. 78-84.
International Search Report issued in corresponding International Patent Application No. PCT/JP2020/016406, dated Jul. 21, 2020, with English translation.

* cited by examiner

*Primary Examiner* — Zohreh A Fay
(74) *Attorney, Agent, or Firm* — RIMON P.C.

(57) ABSTRACT

The purpose of the present invention is to provide a method for producing fruit having improved quality which has fewer restrictions on place and the like and can be more casually used. This method for producing fruit having improved quality uses nanobubble water for a plant body belonging to fruit trees.

12 Claims, 5 Drawing Sheets

METHOD FOR PRODUCING FRUIT HAVING IMPROVED QUALITY

CROSS REFERENCE TO RELATED APPLICATIONS

This application is the U.S. National Phase under 35 U.S.C. § 371 of International Application No. PCT/JP2020/016406, filed on Apr. 14, 2020, which claims the benefit of Japanese Application No. 2019-088131, filed on May 8, 2019, the entire contents of each are hereby incorporated by reference.

TECHNICAL FIELD

The present invention relates to a method for producing fruit having improved quality.

BACKGROUND ART

It is important for producers and dealers of agricultural products to improve the quality of agricultural products. In particular, for fruit trees, people have a large interest in the quality of fruits that are harvests, and therefore, for example, fruits are graded according to the quality; thus, producers seek to have a higher yield of fruits belonging to a higher grade. To date, various methods for improving fruit quality have been developed. Methods described in Patent Literatures 1 and 2 are noted as examples of conventional methods for improving fruit quality.

A quality improvement method described in Patent Literature 1 is a method in which a composition containing a corn steep liquor and having nitrogen, phosphoric acid and potassium at a certain ratio is sprayed to leaves of fruit trees, thereby accelerating the coloration of fruits or increasing the sugar content of fruits.

A quality improvement method described in Patent Literature 2 is a method in which a plant is irradiated with one or a combination of blue light and red light which are absorbed specifically by chloroplasts of plants, whereby a photosynthetic reaction in the chloroplasts is activated to improve plant quality.

CITATION LIST

Patent Literature

Patent Literature 1: JP 5-43370 A
Patent Literature 2: JP 2000-316381 A

SUMMARY OF INVENTION

Technical Problems

However, in the method described in Patent Literature 1, since the effective application range of the corn steep liquor is limited, applicable plants are limited. Further, when the method described in Patent Literature 1 is used, the ratio between components in the composition containing the corn steep liquor needs to be adjusted according to the purpose of use (e.g., a target effect), and substantial time and energy are required to find an appropriate ratio.

Aside from that, since the method described in Patent Literature 2 requires adjustment of irradiation light, this is suitable for the use in indoor cultivation or greenhouse cultivation but unfit for the use in large-scale agricultural fields.

The present invention has been made in view of the above circumstances and aims at achieving the following object.

An object of the present invention is to solve the problems of the conventional art as above and to provide a method for producing fruit having improved quality, which method is less affected by locational and other limitations and is usable more easily.

Solution to Problems

The present inventors have conducted an intensive study to attain the above-described object and found that application of nanobubble water to a plant belonging to fruit trees can result in production of fruit having improved quality, and the present invention has been thus completed.

That is, the present inventors found that the above-described object can be attained by the following constitution.

[1] A method for producing fruit having improved quality, the method comprising application of nanobubble water to a plant belonging to fruit trees.

[2] The method for producing fruit having improved quality according to [1], wherein at least one of sprinkling the nanobubble water, supplying a nutrient supply material having the nanobubble water added thereto, and spraying an agrochemical diluted with the nanobubble water is carried out.

[3] The method for producing fruit having improved quality according to [1] or [2], wherein the nanobubble water contains bubbles with a modal particle size of 10 to 500 nm.

[4] The method for producing fruit having improved quality according to any one of [1] to [3], wherein bubbles contained in the nanobubble water include at least one gas selected from the group consisting of oxygen, nitrogen, carbon dioxide, and ozone.

[5] The method for producing fruit having improved quality according to any one of [1] to [4], wherein the nanobubble water contains bubbles in an amount of $1\times10^8$ to $1\times10^{10}$ bubbles/ml.

[6] The method for producing fruit having improved quality according to any one of [1] to [5], wherein the nanobubble water contains bubbles with a zeta potential of −50 mV to −30 mV.

[7] The method for producing fruit having improved quality according to any one of [1] to [6], wherein the nanobubble water is applied to the plant plural times.

[8] The method for producing fruit having improved quality according to any one of [1] to [7], wherein the plant is a rosaceous plant, a vitaceous plant, an ebenaceous plant or a rutaceous plant.

[9] The method for producing fruit having improved quality according to any one of [1] to [8], wherein the plant is an apple, a Nashi pear, a pear, a cherry, a grape, a persimmon, a peach or *Citrus unshiu.*

[10] The method for producing fruit having improved quality according to any one of [1] to [9], wherein as quality, a sugar content of the fruit is improved.

[11] The method for producing fruit having improved quality according to any one of [1] to [10], wherein in cases where fruits are graded into plural grades according to quality, the nanobubble water is applied to the plant to increase a percentage of fruits falling under a high grade category among the plural grades of quality.

Advantageous Effects of Invention

The method for producing fruit having improved quality according to the invention can be utilized regardless of, for example, whether it is an indoor or outdoor environment and of the size of the cultivation site. In addition, it is only necessary to apply nanobubble water generated with water and predetermined gas to plants, so that the method does not require much time and effort for adjusting the blending ratio of components of a composition used for quality improvement. That is, the present invention makes it possible to provide a method for producing fruit having improved quality, which method is less affected by locational and other limitations and is usable more easily.

DETAILED DESCRIPTION OF THE INVENTION

Figure 1:
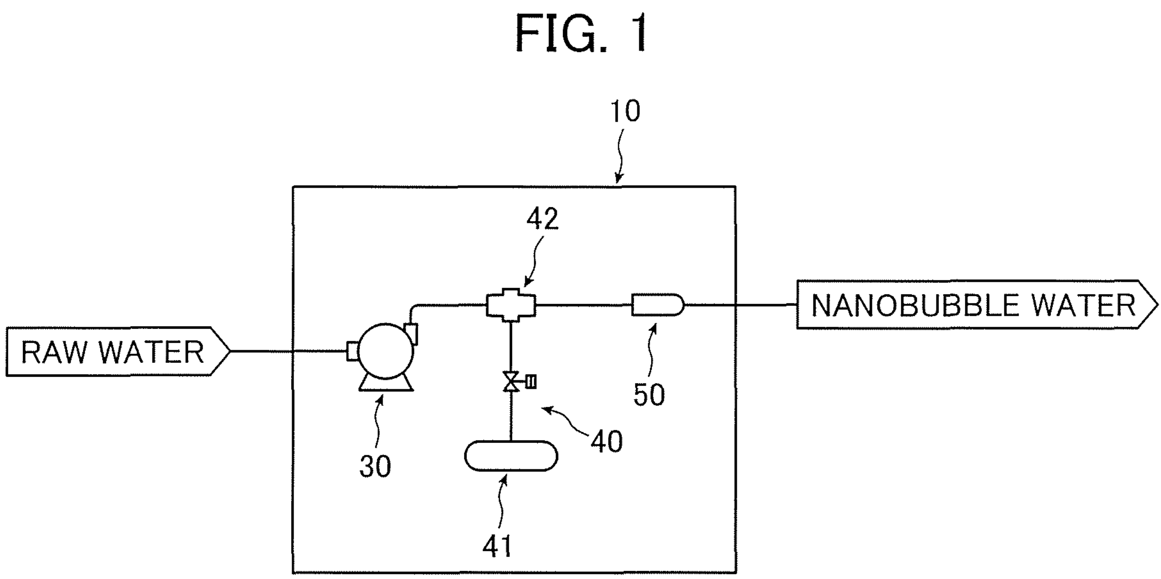
FIG. 1 is a schematic view showing an example of a nanobubble generating apparatus.

The present invention is described below in detail. While the constitutional requirements may be described below based on a typical embodiment of the present invention, the present invention is not limited to the embodiment.

In the description, a numerical range stated using the form of "(from) . . . to . . . " should read as a range including the former number as the lower limit value and the latter number as the upper limit value.

The method for producing fruit having improved quality according to the invention is a method for producing fruit having improved quality that comprises application of nanobubble water to a plant belonging to fruit trees.

The term "method for producing fruit having improved quality" herein refers to a method for producing fruit whose quality is improved compared to fruit obtained by an ordinary fruit production method (i.e., a method that does not involve application of nanobubble water to a plant) and includes, for instance, a method that allows the index used for fruit quality evaluation, such as the sugar content, to be higher than that in the case of using an ordinary production method, or a method that increases the percentage of fruits falling under a high grade category in cases where fruits are graded according to the quality.

The term "nanobubble water" refers to water that contains bubbles having a diameter of less than 1 μm, more precisely, water in which nanobubbles are incorporated. In connection with the expression "water in which nanobubbles are incorporated," water used for generation of nanobubble water (i.e., raw water of nanobubble water; for instance, well water containing impurities) and inevitably containing nanobubbles due to its properties and the like is excluded from the "water in which nanobubbles are incorporated."

The diameter (particle size) of bubbles contained in nanobubble water, and the modal particle size of bubbles and the number of bubbles, both of which are described later, are values obtained by measuring the Brownian motion-moving speed of bubbles in water by a nanoparticle tracking analysis method. In the present description, numeral values obtained by measurement using a nanoparticle analysis system of NanoSight series (manufactured by NanoSight Ltd.) are used. The nanoparticle analysis system of NanoSight series (manufactured by NanoSight Ltd.) can measure the Brownian motion speed of particles and calculate the diameter (particle size) based on the measured speed. The modal particle size can be determined as the mode diameter from the particle size distribution of existing nanoparticles.

According to the present invention, by applying nanobubble water to a plant belonging to fruit trees, it is possible to improve fruit quality through relatively easy operation regardless of the cultivation site and the like.

Although the reasons of this are not clear for details, the present inventors infer that, for example, application of nanobubble water improves resistance of a plant to diseases and pests, and as a result, fruits in which nutrients are accumulated at the end are to have improved quality. Thus, in the present invention, what is needed to improve fruit quality is only application of nanobubble water, it is not necessary to prepare a special fertilizer or adjust irradiation light, and in addition, the method is not greatly affected by the location conditions, the size and other factors of the cultivation site. Therefore, the present invention makes it possible to improve fruit quality more easily regardless of the location and the like.

In the present invention, the fruit quality refers to properties other than the magnitude of size and weight. The fruit quality includes the quality evaluated based on the appearance, such as the shape, the color, and the presence or absence of blemishes, the quality evaluated based on contained components, such as the sugar content (ripeness) and the acidity, and the quality evaluated based on human's sensibilities, such as the texture and the deliciousness.

The fruit quality varies depending on the type of fruits and sometimes varies among producers and locations. In Japan, generally, there is the case that fruits of each type are graded into plural grades including Excellent, Very Good and Good according to the quality or the case that fruits are graded into plural grades ranging from good products to inferior products according to the quality.

Grade classifications of fruits are described by taking grade classifications defined for such type of fruits as *Citrus unshiu*, cherry, grape, peach, apple, persimmon, Nashi pear, and pear as examples of standards regarding the fruit quality. Those grade classifications described below are only an example and may vary depending on the producer and the location as described above.

(Regarding *Citrus unshiu* Quality)

The *Citrus unshiu* quality is classified into five grades of "Choicest," "Excellent," "Very Good," "Good" and "Substandard" according to the sugar content (ripeness) as shown in Table 1 below. As shown in the table, applicability conditions of the grades may differ between the varieties. The grade of *Citrus unshiu* is determined in terms of other items (e.g., the shape, the degree of coloring, and the like) than the items shown in Table 1 below in some cases.

TABLE 1

| | Choicest | Excellent | Very Good | Good | Substandard |
|---|---|---|---|---|---|
| Early-maturing variety | Sugar content of 12 degrees or more | Sugar content of 11 degrees or more | Sugar content of 10 degrees or more | Sugar content of less than 10 degrees | Having blemishes or cracks |
| Aoshima | Sugar content of 13 degrees or more | Sugar content of 12 degrees or more | Sugar content of 11 degrees or more | Sugar content of less than 11 degrees | Having blemishes or cracks |

(Regarding Cherry Quality)

The cherry quality is classified into three grades of "Excellent," "Very Good" and "Good" according to the colored area (that is the area percentage of a colored portion on a fruit and is equivalent to the degree of coloring), the shape, the ripeness and other factors, as shown in Table 2 below. For the grades of cherries, other standards than those shown in Table 2 may be present, and in Test 2 to be described later, the grades are defined with classifications different from those of Table 2 (see Table 18).

TABLE 2

| | Excellent | Very Good | Good |
|---|---|---|---|
| Cherry | Colored area of 70% or more<br>Ones of the same variety; having the variety-specific shape, excellent color and gloss, and excellent uniformity and appearance; having no damage caused by diseases or pests; having proper ripeness at uniform ripeness level | Colored area of 60% or more<br>Ones of the same variety; having the variety-specific shape, very good color and gloss, and good uniformity and appearance; having damage caused by diseases or pests; having proper ripeness | Colored area of 50% or more<br>Ones of the same variety; having the variety-specific shape, good color and gloss, and good uniformity; no having almost no damage caused by diseases or pests; having good ripeness |

(Regarding Grape Quality)

The grape quality is classified into three grades of "Excellent," "Very Good" and "Good" according to the shape, the color, the sugar content (ripeness) and other factors as shown in Table 3 below. For the grape quality, applicability conditions of the grades differ depending on the difference in variety or cultivation method (i.e., whether it is greenhouse cultivation or open-field cultivation), as shown in Tables 4 to 7. For the grades of grapes, other standards than those shown in Tables 3 to 7 may be present, and in Test 3 to be described later, the grades are defined with classifications different from those of Tables 3 to 7 (see Table 20).

TABLE 3

| Common | | |
|---|---|---|
| Excellent | Very Good | Good |
| Ones of the same variety; having a salable shape; being excellent in the color and gloss, the uniformity of clusters, and the size and appearance of a grape; having no damage caused by diseases or pests and no cracking; having the most excellent ripeness and taste | Ones of the same variety; having a salable shape; being very good in the color and gloss, the uniformity of clusters, and the size and appearance of a grape; having no damage caused by diseases or pests and no cracking; having very good ripeness and taste | Ones of the same variety; haying a salable shape; being good in the color and gloss, the uniformity of clusters, and the size and appearance of a grape; having almost no damage caused by diseases or pests and almost no cracking; having good taste |

TABLE 4

| Delaware (Greenhouse, Open-field) | | | |
|---|---|---|---|
| | Excellent | Very good | Good |
| Taste (ripeness) | Most excellent (saccharimeter reading of 18 degrees or more and pH of 3.2 or more) | Very good (saccharimeter reading of 18 degrees or more and pH of 3.2 or more) | Good (saccharimeter reading of 17 degrees or more and pH of 3.2 or more) |
| Coloring | Most excellent | Almost no difference between the front and back sides | Not reaching the Excellent or Very Good level but having salability |
| Shape | Having the most excellent variety-specific shape (with stems being not seeable even when a cluster of grapes is laid) | Having a very good variety-specific shape (with stems being slightly seeable when a cluster of grapes is laid; and with lack of up to 3 grapes) | Not reaching the Excellent or Very Good level but having salability |
| Resilience/ Size uniformity | Having the most excellent variety-specific resilience and size uniformity (grape size having no variation and having uniformity) | Having very good variety-specific resilience and size uniformity (with slightly insufficient thinning) | Not reaching the Excellent or Very Good level but having salability |
| Cracking | No cracking | No cracking | No cracking |
| Rusty discoloration | No discoloration | Slightly discolored (up to a third of one grape and up to 10% of one cluster) | At the third best level following Very Good (up to a half of one grape and up to 20% of one cluster) |
| Bloom | Well-covered with bloom | Slightly inferior | Inferior |
| Dirt | No dirt | No dirt | No dirt |
| Damage caused by diseases or pests | No damage | No damage | No damage |

TABLE 5

| Shigyoku "seedless" (Greenhouse, Open-field) | | | |
|---|---|---|---|
| | Excellent | Very good | Good |
| Taste (ripeness) | Most excellent (saccharimeter reading of 17 degrees or more and pH of 3.2 or more) | Very good (saccharimeter reading of 17 degrees or more and pH of 3.2 or more) | Good (saccharimeter reading of 16 degrees or more and pH of 3.2 or more) |
| Coloring | Having the variety-specific color and gloss and being colored in dark purple color thoroughly even around the peduncle | Having the variety-specific color and gloss and being colored in dark purple color in at least two thirds of each grape | Not reaching the Excellent or Very Good level but having salability |
| Shape (cluster shape) | Having excellent compactness (with no gap) | Having compactness (with a few gaps) | Not reaching the Excellent or Very Good level but having salability |
| Resilience/ Size uniformity | Having the most excellent variety-specific resilience and size uniformity of grapes (a target weight of one grape is at least 11 g) | Having the most excellent variety-specific resilience and size uniformity of grapes (a target weight of one grape is at least 9 g) | Not reaching the Excellent or Very Good level but having salability |
| Cracking | No cracking | No cracking | No cracking |
| Rusty discoloration/ Rubbing | Not present | Not very noticeable (with grapes each having a 5-mm or smaller mark accounting for up to 20% of one cluster) | At the third best level following Very Good (with grapes each having a 10-mm or smaller mark accounting for up to 30% of one cluster) |
| Bloom | Well-covered with bloom | Slightly inferior | Inferior |
| Dirt | No dirt | No dirt | No dirt |
| Damage caused by putrefactive disease (e.g., ripe rot) | No damage | No damage | No damage |
| Thrips | No damage | No damage | A little damage but having salability |
| Other damage caused by diseases or pests | No damage | No damage | A little damage but having salability |

TABLE 6

| Wasekaiji, Kaiji (Greenhouse, Open-field) | | | |
|---|---|---|---|
| | Excellent | Very good | Good |
| Taste (ripeness) | Most excellent (saccharimeter reading of 17 degrees or more) | Very good (saccharimeter reading of 17 degrees or more) | Good |
| Coloring | Having the variety-specific color and gloss and being colored up to the region around the peduncle | Having the variety-specific color and gloss, with coloring being slightly inferior to the Excellent level | Not reaching the Excellent or Very Good level but having salability |
| Shape (cluster shape) | Having excellent compactness | Having compactness | Not reaching the Excellent or Very Good level but having salability |
| Resilience/ Size uniformity | Grapes having the variety-specific resilience, and large and uniform size | Grapes having slightly inferior varity-specific resilience and uniformity in size | Not reaching the Excellent or Very Good level but having salability |
| Dirt | No dirt | No dirt | No dirt |
| Berry shrivel | Not present | Not noticeable (20% or less) | Not reaching the Excellent or Very Good level but having salability |
| Other damage caused by diseases or pests | No damage | No damage | Having a little damage but having salability |

TABLE 7

| Shine Muscat (Greenhouse, Open-field) | | | |
|---|---|---|---|
| | Excellent | Very good | Good |
| Taste (ripeness) | Most excellent (saccharimeter reading of 18 degrees or more) | Very good (saccharimeter reading of 18 degrees or more) | Good |
| Coloring | Having the variety-specific color and gloss | Having the variety-specific color and gloss, and being discolored due to sunburn but not very noticeable | Not reaching the Excellent or Very Good level but having salability |
| Shape (cluster shape) | Haying excellent compactness | Having compactness | Not reaching the Excellent or Very Good level but having salability |
| Resilience/ Size uniformity | Grapes having the variety-specific resilience, and large and uniform size | Grapes having slightly inferior variety-specific resilience and size uniformity | Not reaching the Excellent or Very Good level but having salability |
| Rusty discoloration/ Rubbing | Not present | Not very noticeable | At the third best level following Very Good |
| Dirt | No dirt | No dirt | No dirt |
| Other damage caused by diseases or pests | No damage | No damage | No damage |

(Regarding Peach Quality)

The peach quality is classified into three grades of “Excellent,” “Very Good” and “Good” according to the shape, the color, the sugar content (ripeness) and other factors as shown in Table 8 below. For the peach quality, applicability conditions of the grades differ depending on the difference in cultivation method (i.e., whether it is greenhouse cultivation or open-field cultivation), as shown in Tables 9 and 10. For the grades of peaches, other standards than those shown in Tables 8 to 10 may be present, and in Test 4 to be described later, the grades are defined with classifications different from those of Tables 8 to 10 (see Table 22).

TABLE 8

| Common | | |
|---|---|---|
| Excellent | Very good | Good |
| Ones of the same variety; having the variety-specific shape, excellent color and | Ones of the same variety; having the variety-specific shape, very good color and | Ones of the same variety; having the variety-specific shape, good color and gloss, |

TABLE 8-continued

| Common | | |
|---|---|---|
| Excellent | Very good | Good |
| gloss, and very good uniformity and appearance; having no damage caused by diseases or pests; showing proper ripeness at the uniform ripeness level | gloss, and good uniformity and appearance; having no damage caused by diseases or pests; showing proper ripeness | and good appearance; having almost no damage caused by diseases or pests; showing good ripeness |

TABLE 9

| | Greenhouse cultivation | | |
|---|---|---|---|
| | Excellent | Very good | Good |
| Ripeness | One whose variety-specific base color has been decolorized by amount 50% and which is not overripe | Same as Excellent | One whose decolorization of the base color is slightly less than ones of Excellent and Very Good and which is not unripe |
| Color and gloss (Coloring) | One whose 30% or more has been colored from the fruit tip and having the variety-specific color and gloss (For reference: In cases that a peach is of "25 peaches per box" type, when three fingers are put along the seam, a colored portion is largely out of those fingers) | One having a coloring percentage of 20% or more, being colored from the fruit tip, and having the variety-specific color and gloss (For reference: In cases that a peach is of "25 peaches per box" type, when a thumb is put along the seam, a colored portion is partly out of the thumb) | One having a coloring percentage of 20% or less and being colored from the fruit tip |
| Shape (cluster shape) | Having a normal shape | Having a slightly abnormal shape | Having the shape being not remarkably abnormal |
| Leaf rubbing | No mark above the equator/ On one fruit, having at most one linear mark of up to 1 cm below the equator, the mark being unnoticeable | Having at most three linear marks of up to 1 cm on one fruit, the marks being not remarkably noticeable, where at most one mark is allowed above the equator | Having a most three marks of up to 1 cm square size on one fruit |
| Cracking | No cracking | No cracking | Slightly cracked to the extent it would not trigger rot |
| Pit split | One whose pit split is hardly recognizable from the appearance One in which the stalk may have come off but a skin in the stalk portion is not peeled, and having a trace of the stalk | One having slightly poor appearance due to pit split, and no cracking at the stalk portion | One equivalent to Good, having the stalk, with a small hole recognizable |
| Sunburn | No sunburn | No sunburn | Not very noticeable |
| Dirt | No dirt | No dirt | No dirt |
| Stem pressing | One in which a mark of stem pressing at the stalk portion is smaller than the width of a little finger and not associated with overripeness; however, this does not apply to the other region than the stalk portion | Same as Excellent | Same as Excellent |
| Scab | No black spot | No black spot above the equator Having up to five black spots below the equator, those spots being scattered and not clustering | Having black spots not clustering on a fruit and not resulting in unpleasant appearance |
| Other damage caused by diseases or pests | No damage | No damage | No damage |

TABLE 10

| Open-field cultivation | | | |
|---|---|---|---|
| | Excellent | Very good | Good |
| Ripeness | One whose variety-specific base color has been decolorized by about 50% and which is not overripe | Same as Excellent | One whose decolorization of the base color is slightly less than ones of Excellent and Very Good and which is not unripe |
| Color and gloss (Coloring) | One whose 40% or more has been colored from the fruit tip and having the variety-specific color and gloss (For reference: In cases that a peach is of type "25 peaches per box", when three fingers are put along the seam, a colored portion is largely out of those fingers) | One having a coloring percentage of 20% or more, being colored from the fruit tip, and having the variety-specific color and gloss (For reference: In cases that a peach is of type "25 peaches per box", when a thumb is put along the seam, a colored portion is partly out of the thumb) | Same as Very Good |
| Shape (cluster shape) | Having a normal shape | Having a slightly abnormal shape | Having the shape being not remarkably abnormal |
| Leaf rubbing | No mark above the equator/ On one fruit, having at most one linear mark of up to 1 cm below the equator, the mark being unnoticeable | Having at most three linear marks of up to 1 cm on one fruit, the marks being not remarkably noticeable, where at most one mark is allowed above the equator | Having a most three marks of up to 1 cm square size on one fruit |
| Cracking | No cracking | No cracking | Slightly cracked to the extent it would not trigger rot |
| Pit split | One in which pit split is hardly recognizable from the appearance One in which the stalk may have come off but a skin in the stalk portion is not peeled, and having a trace of the stalk | One having slightly poor appearance due to pit split, and no cracking at the stalk portion | One equivalent to Very Good, having the stalk, with a small hole recognizable |
| Sunburn | No sunburn | No sunburn | Not very noticeable |
| Dirt | No dirt | No dirt | No dirt |
| Stem pressing | One in which a mark of stem pressing at the stalk portion is smaller than the width of a little finger and not associated with overripeness; however, this does not apply to the other region than the stalk portion | Same as Excellent | Same as Excellent |
| Scab | No black spot | No black spot above the equator Having up to five black spots below the equator, those spots being scattered and not clustering | Having black spots not clustering on a fruit and not resulting in unpleasant appearance |
| Other damage caused by diseases or pests | No damage | No damage | No damage |

(Regarding Apple Quality)

The apple quality is classified into four grades of "Excellent," "Very Good," "Good" and "Average" according to the coloring, the shape and other factors as shown in Table 11 below. For the grades of apples, other conditions than those shown in Table 11 may be present, and in Test 6 to be described later, the grades are defined with conditions different from those of Table 11 (see Table 25).

TABLE 11

| | Excellent | Very Good | Good | Average |
|---|---|---|---|---|
| Standards for fruit grading | Ones of the same variety; having the variety-specific shape; having at least the color and gloss percentage specified in the appendix table; having no damage caused by diseases or pests, as well as no other types of damage; having the most excellent size uniformity and ripeness | Ones of the same variety; having the variety-specific shape; having at least the color and gloss percentage specified in the appendix table; having no damage caused by diseases or pests, as well as no other types of damage; having very good size uniformity and ripeness | Ones of the same variety; having the variety-specific shape; having at least the color and gloss percentage specified in the appendix table; having no damage caused by diseases or pests, as well as no other types of damage; with size uniformity and ripeness following Very Good | Not reaching the Excellent, Very Good or Good level but having salability |
| Coloring rate | Having at least the color and gloss percentage specified in the appendix table and taking on excellent ripe color | Having at least the color and gloss percentage specified in the appendix table and taking on very good ripe color | Having at least the color and gloss percentage specified in the appendix table and taking on the third best ripe color following Very Good | |
| Shape | Having an excellent variety-specific shape | Having a very good variety-specific shape | At the third best level following Very Good | |
| Russeting at or around the stalk cavity | Having russeting around the stalk but not noticeable | Having russeting extending up to the shoulder part, having a linear shape, and being larger than 10 yen coin size. | Having russeting extending up to the shoulder part and being larger than 10 yen coin size | |
| Other russeting | No russeting but having russeting spreading below the equator on the fruit surface, which is not noticeable | Having russeting that may be present even above the equator on the fruit surface but spreads, occupies ⅕ or less in total, and is not noticeable | Having russeting that occupies ⅓ or less of the fruit surface and is not remarkable even when present above the equator | |
| Sunburn | No sunburn | Having a portion of at most 2 cm diameter (1 yen coin) colored into pale pink | Having sunburn occupying ⅕ or less of the fruit surface but not remarkable, where browned ones are excluded | |
| Scale insect | No scale insect | No scale insect | Having a little damage and having salability | |
| Absence of the stalk | Having the stalk | One whose stalk has come off but whose color and gloss are graded as Excellent | One whose stalk has come off but whose color and gloss are graded as Very Good | |
| Upside-down apple | No upside-down one | No upside-down one | Not remarkable | |
| Damage caused by diseases or pests | No damage | No damage | Slightly damaged and having salability | |
| Blemish damage | No damage | No damage | Not remarkable | |

Appendix table Color and gloss percentage (Coloring including ripe color)

| Item | Grade | | |
|---|---|---|---|
| | Excellent | Very Good | Good |
| Tsugaru | 40% or more | 20% or more | At least slightly colored |
| Fuji Senshu | 80% or more | 60% or more | 40% or more |
| Yoko | 90% or more | 70% or more | 50% or more |

(Regarding Persimmon Quality)

The persimmon quality is classified into three grades of "Excellent," "Very Good" and "Good" according to the shape, the color and other factors as shown in Tables 12 and 13 below. For the persimmon quality, applicability conditions of the grades may differ between varieties.

TABLE 12

| Common | | |
|---|---|---|
| Excellent | Very Good | Good |
| Ones of the same variety; having the variety-specific shape, excellent color and gloss, and very good uniformity and appearance; having no damage caused by diseases or pests; showing proper ripeness at the uniform ripeness level | Ones of the same variety; having the variety-specific shape, very good color and gloss, and good uniformity and appearance; having no damage caused by diseases or pests; showing proper ripeness | Ones of the same variety; having the variety-specific shape, good color and gloss, and good uniformity; having almost no damage caused by diseases or pests; showing proper ripeness |

TABLE 13

| | Excellent | Very Good | Good |
|---|---|---|---|
| Shape | Having the variety-specific shape, with minor defects of fruit shape due to lack of seeds or other reasons | Having minor depression in a fruit tip region, with unremarkable defects of fruit shape due to lack of seeds or other reasons | Not reaching the Excellent or Very Good level but having salability |
| Color and gloss | One in orange yellow color and colored up to the region around the calyx (For reference: The fruit color according to a color chart is 5 to 6 at or around the fruit tip region) | One in orange yellow color, with nonuniform coloring/Or one in yellow color and colored up to the region around the calyx (For reference: The fruit color according to a color chart is 4 at or around the fruit tip region) | |
| Sooty mold | No damage | Having damage only around the calyx and not noticeable | |
| Scale insect | No damage | No damage | |
| Other damage caused by diseases or pests | No damage | No damage | |
| Blemish damage | No damage | In the case of having damage such as stem rubbing, the damage occupying 5% or less of the fruit surface in total | |
| Calyx gap | One in which no gap is recognizable at the calyx attachment portion | One in which a gap at the calyx attachment portion is not remarkable | |
| Other deficiencies | One in which deficiencies such as sunburn, agrichemical-induced damage and other damage occupy 5% or less of the fruit surface in total and are not noticeable (one not contaminated by Bordeaux mixture) | One in which deficiencies such as sunburn, agrichemical-induced damage and other damage occupy 10% or less of the fruit surface in total and are not remarkable (one slightly contaminated by Bordeaux mixture) | |
| Bloom | Well-covered with bloom | Slightly inferior | |

(Regarding Nashi Pear Quality)

The Nashi pear quality is classified into three grades of "Excellent," "Very Good" and "Good" according to the shape, the color, the ripeness and other factors as shown in Table 14 below. For the quality of Nashi pears cultivated in greenhouses, "Average" is added to the foregoing three grades, and thus, the quality is classified into four grades as shown in Table 15 below.

TABLE 14

| Common | | |
|---|---|---|
| Excellent | Very Good | Good |
| Ones of the same variety; having the variety-specific shape; having no damage caused by diseases or pests; having the most excellent color and gloss and ripeness | Ones of the same variety: having the variety-specific shape; having no damage caused by diseases or pests: having color and gloss and ripeness slightly inferior to the Excellent level | Ones of the same variety; having the variety-specific shape; having almost no damage caused by diseases or pests; having color and gloss and ripeness slightly inferior to the Very Good level |

TABLE 15

| | Greenhouse cultivation | | | |
|---|---|---|---|---|
| | Excellent | Very Good | Good | Average |
| Color and gloss/ Shape | Having the variety-specific color and gloss and shape and the most excellent quality | Having the variety-specific color and gloss and shape and very good quality | At the third best level following Very Good | Not reaching the Excellent, Very Good or Good level but having salability |
| Russeting/ Dappling | Having russeting or dappling below the equator and not noticeable | Not remarkable | Not unpleasant | |
| Sunburn | Sunburned below the equator and not noticeable | Not remarkable | Not unpleasant | |
| Damage caused by diseases or pests | No damage | No damage | Slightly damaged and having salability | |
| Blemish damage | No damage | No damage | Having minor damage such as stem rubbing | |
| Absence of stalk | Having the stalk | One whose stalk has come off but graded as Excellent in other factors | One whose stalk has come off but graded as Very Good in other factors | |

(Regarding Pear Quality)

The pear quality is classified into three grades of "Excellent," "Very Good" and "Good" according to the shape, the color and other factors as shown in Table 16 below.

TABLE 16

| | Excellent | Very Good | Good |
|---|---|---|---|
| Shape | Having the variety-specific properties and the most excellent quality | Having the variety-specific properties and good quality | Not reaching the Excellent or Very Good level but having salability |
| Color and gloss/ Ripeness | Having the variety-specific properties and good uniformity (unripe/overripe ones excluded) | Having the variety-specific properties and good uniformity (unripe/overripe ones excluded) | |
| Uniformity | Not including one belonging to a different size category | Same as the left | |

TABLE 16-continued

| | Excellent | Very Good | Good |
|---|---|---|---|
| Sunburn | Not noticeable | Not remarkable | |
| Damage caused by diseases or pests | No damage | No damage | |
| Absence of the stalk | Having the stalk | Having the stalk | |
| Blemish damage | Not having blemish damage such as sting damage or bumping damage | Slightly having blemish damage such as sting damage or bumping damage | |
| Russeting | Not remarkable | At the second best level following Excellent | |

While the quality standards of fruits differ among varieties as described above, according to the present invention, the application of nanobubble water makes it possible to improve the quality of various fruits, specifically increase the percentage of fruits falling under a high grade category among plural grades of quality for each type of fruit, for instance, increase the percentage of fruits falling under the "Excellent" category or the "Choicest" category that is higher in grade than "Excellent" (hereinafter also called "excellent product percentage") (see Examples to be described later). That is, the use of the production method of the invention can increase the excellent product percentage of fruits compared to usual production methods (i.e., production methods not using nanobubble water).

For reference, the excellent product percentages obtained with usual production methods are shown for the fruits listed below. However, the values below are reference values of the excellent product percentage and, needless to say, the excellent product percentage may vary depending on the variety, the cultivation location, the grower and other factors.

*Citrus unshiu* (variety: Aoshima) The percentage of Choicest: 20%, the percentage of Excellent: 50%

Cherry (variety: Sato Nishiki) The percentage of Choicest: 40%, the percentage of Excellent: 70%

Grape (variety: Kyoho) 80%

Peach 10% The percentage of Choicest: 10%, the percentage of Excellent: 60%

Apple (variety: Fuji) The percentage of Choicest: 10%, the percentage of Excellent: 60%

Nashi pear 60%

Pear 70%

Aside from that, while the quality standards differ among varieties as described above, for the sugar content which is one item of quality evaluation for respective fruits, common improvements can be made across varieties owing to the present invention (see Examples described later). That is, the use of the production method of the invention can improve (increase) the sugar content of fruits as the quality compared to usual production methods (i.e., production methods not using nanobubble water).

For reference, the sugar contents obtained with usual production methods are shown for the fruits listed below. However, the values below are reference values of typical sugar contents of the respective fruits and, needless to say, the sugar content may vary depending on the variety, the cultivation season, the cultivation location and other factors.

*Citrus unshiu* (variety: Aoshima) 11 degrees

Cherry (variety: Sato Nishiki) 14 degrees

Grape (variety: Kyoho) 18 degrees

Peach 13 degrees

Apple (variety: Fuji) 15 degrees

Persimmon 15 degrees

Nashi pear 14 degrees

Pear 15 degrees

In the present invention, the modal particle size of bubbles contained in the nanobubble water is preferably from 10 to 500 nm and more preferably from 30 to 300 nm because a fruit quality improving effect is further increased, and even more preferably from 70 to 130 nm because, in particular, bubbles may remain for a longer period of time.

The gas constituting bubbles contained in the nanobubble water is not particularly limited but is preferably a gas other than hydrogen from the view point of a longtime existence in water. Specific examples of the gas include air, oxygen, nitrogen, fluorine, carbon dioxide, and ozone.

Among these, it is preferable to contain at least one gas selected from the group consisting of oxygen, nitrogen, carbon dioxide and ozone because the fruit quality improving effect is further increased, and it is more preferable to contain oxygen and/or carbon dioxide because bubbles can remain for a longer period of time.

Here, the expression "contain oxygen and/or carbon dioxide" means containing oxygen and/or carbon dioxide at a higher concentration than the oxygen concentration in air. The same applies to nitrogen and ozone. The concentration of oxygen is preferably not less than 30 vol % of bubbles and more preferably more than 50 volt and not more than 100 vol %. The concentration of carbon dioxide is preferably not less than 1 volt of bubbles and more preferably more than 10 vol % and not more than 100 volt.

The nanobubble water contains bubbles in an amount of preferably $1\times10^{8}$ to $1\times10^{10}$ bubbles/ml because the fruit quality improving effect is further increased, and more preferably more than $1\times10^{8}$ bubbles/ml and less than $1\times10^{10}$ bubbles/ml and even more preferably $5\times10^{8}$ to $5\times10^{9}$ bubbles/mi because, particularly, the bubble generation time and the bubble remaining property are well balanced.

The zeta potential of bubbles contained in the nanobubble water is preferably a negative value and more preferably a potential of not more than −20 mV because the fruit quality improving effect is further increased, and even more preferably −50 mV to −30 mV for the purpose of, in particular, increasing the effect of controlling damage caused by diseases or pests. The value of zeta potential is known to vary depending on the type of bubbles, and it is further preferable that the zeta potential be lower (on a more negative side) than the zeta potential of bubbles constituted of air. The zeta potential is measured by, for instance, microscopic electrophoresis and can be measured with a known zeta potential measurement device employing this method (one example of such a measurement device is "Zata View" manufactured by MicrotracBEL Corp.).

The nanobubble water may further contain a component other than water and bubbles.

Exemplary methods of generating the nanobubble water include a static mixer method, a venturi method, a cavitation method, a vapor condensation method, an ultrasonic method, a swirling flow method, a pressurized dissolution method, and a fine pore method.

The method for producing fruit having improved quality according to the invention may include a generation step of generating the nanobubble water prior to application of the nanobubble water. That is, the method for producing fruit having improved quality according to the invention may include a generation step in which water is introduced from a water source such as a water storage tank, a well or agricultural water into a nanobubble generating apparatus to thereby generate nanobubble water and an application step in which the generated nanobubble water is applied to a plant.

In the foregoing generation step, exemplary techniques of introducing water from a water source into a nanobubble generating apparatus include a technique in which water drawn from a water source using a tub, a pump or another means is supplied to the nanobubble generating apparatus. Another technique thereof is a technique in which a flow path installed between a water source and a nanobubble generating apparatus is connected to the nanobubble generating apparatus and water is directly supplied from the flow path to the nanobubble generating apparatus.

As an apparatus used for generating the nanobubble water, it is favorable to use an apparatus that does not intentionally generate a radical, and a specific example thereof is a nanobubble generating apparatus described in paragraphs [0080] to [0100] of JP 2018-15715 A. The contents of the above reference are incorporated in the present description.

Except for the apparatus described in the above patent publication, another example of an apparatus capable of generating nanobubble water is an ultrafine bubble generating apparatus shown in FIG. 1 including a liquid discharger that discharges water, a gas incorporating device that pressurizes gas and incorporates the gas into the water discharged from the liquid discharger, and an ultrafine bubble generator that allows the water having the gas incorporated therein to pass through an inside of the ultrafine bubble generator to generate ultrafine bubbles in the water, wherein, between the liquid discharger and the ultrafine bubble generator, the gas incorporating device pressurizes gas and incorporates the gas into a liquid being in a pressurized state and flowing toward the ultrafine bubble generator.

A nanobubble generating apparatus 10 shown in FIG. 1 includes therein a liquid discharger 30, a gas incorporating device 40 and a nanobubble generating nozzle 50.

The liquid discharger 30 constituted of a pump draws in raw water of nanobubble water (e.g., well water) and discharges the raw water. The gas incorporating device 40 includes a vessel 41 in which compressed gas is enclosed, and a substantially cylindrical gas incorporating device body 42. The gas incorporating device 40 introduces the compressed gas in the vessel 41 into the gas incorporating device body 42 while allowing the water discharged from the liquid discharger 30 to flow inside the gas incorporating device body 42. Consequently, gas-incorporated water is generated in the gas incorporating device body 42.

The nanobubble generating nozzle 50 generates nanobubbles in the gas-incorporated water according to the principle of pressurized dissolution when the gas-incorporated water passes through the inside of the nanobubble generating nozzle 50, and for the structure thereof, the same structure as that of the nanobubble generating nozzle described in JP 2018-15715 A may be employed. Nanobubble water generated in the nanobubble generating nozzle 50 is ejected from a tip end of the nanobubble generating nozzle 50, then flows out the nanobubble generating apparatus 10, and is delivered to a predetermined destination via a flow path that is not shown.

As described above, between the liquid discharger 30 and the nanobubble generating nozzle 50 in the nanobubble generating apparatus 10, the gas incorporating device 40 incorporates compressed gas into water (raw water) being in a pressurized state and flowing toward the nanobubble generating nozzle 50. Owing to this configuration, defects such as cavitation that may occur when gas is incorporated into water on the intake side (suction side) of the liquid discharger 30 can be avoided. Besides, since gas in a pressurized (compressed) state is incorporated into water, gas can be incorporated into water against the water pressure at the place where the gas is incorporated. Accordingly, gas can be appropriately incorporated into water without particularly generating a negative pressure at the place where the gas is incorporated.

In addition, the liquid discharger 30 is connected on the suction side thereof with the flow path of water supplied from a water source such as a well or a water tap, and the pressure of the water flowing from the upstream side of the liquid discharger 30 into the liquid discharger 30 in the flow path (i.e., the water pressure on the suction side) is preferably a positive pressure. When this is the case, the above-described configuration is more effective. More specifically, when the water pressure (the suction pressure) on the upstream side of the liquid discharger 30 is a positive pressure, gas is to be incorporated into water on the downstream side of the liquid discharger 30, and this further emphasizes the significance of the configuration of the nanobubble generating apparatus 10 capable of appropriately incorporating gas into water also on the downstream side of the liquid discharger 30.

Water (raw water) used to generate the nanobubble water is not particularly limited, and use can be made of, for example, rainwater, tap water, well water, surface water, agricultural water and distilled water. Raw water may be subjected to another treatment before being used to generate nanobubble water. Examples of such another treatment include pH adjustment, precipitation, filtration and disinfection (sterilization). Specifically, when agricultural water is used for instance, agricultural water having been subjected to precipitation and/or filtration may typically be used.

In the present invention, a mode of applying the nanobubble water to a plant varies depending on the plant cultivation method and thus is not particularly limited, and examples thereof include a mode where the nanobubble water is sprinkled in the soil culture, the nutrient-solution soil culture (irrigation and fertilization culture) or the like (the nanobubble water is irrigated in the case of nutrient-solution soil culture). In this case, a specific water sprinkling method is not particularly limited, and examples thereof include a method involving spraying nanobubble water over the whole of a plant, a method involving spraying nanobubble water over a part (e.g., stems or leaves) of a plant, and a method involving spraying nanobubble water over soil in which a plant is planted.

As the mode of applying the nanobubble water to a plant, another conceivable mode is a mode where a nutrient supply material having the nanobubble water added thereto is supplied in the soil culture, the nutrient-solution soil culture or the like. Examples of the "nutrient supply material having the nanobubble water added thereto" include a culture solution generated using the nanobubble water, a fertilizer fermented using the nanobubble water, and a nutritional supplement diluted with the nanobubble water. The method of supplying the nutrient supply material is not particularly limited, and examples thereof include a method involving sprinkling the material to soil in which a plant is planted, a method involving pouring the material to the whole of a plant, a method involving applying the material to a part (e.g., stems or leaves) of a plant, and a method involving supplying a culture solution at the time of irrigation.

As the mode of applying the nanobubble water to a plant, still another conceivable mode is a mode where an agrochemical diluted with the nanobubble water is sprayed in the soil culture. Examples of an agrochemical spraying method include a method involving spraying the agrochemical over the whole of a plant and a method involving spraying water over a part (e.g., stems or leaves) of a plant.

The mode of applying the nanobubble water to a plant is also applicable to other cultivation methods (e.g., hydroponic culture, spray culture, and solid medium culture) than the soil culture and the nutrient-solution soil culture.

The number of times of application of the nanobubble water is not particularly limited. The nanobubble water may be applied at least one time during a cultivation period including a fruit cluster enlargement period and is preferably applied plural times in order to effectively exert the fruit quality improving effect; for instance, it is better to apply the nanobubble water ten or more times during a period of time from bearing of a flower bud until the harvest time.

In the present invention, a plant applied with the nanobubble water is not particularly limited as long as it is a plant belonging to fruit trees, and is preferably a rosaceous plant, a vitaceous plant, an ebenaceous plant or a rutaceous plant because effects of the invention can be exhibited in a meaningful way.

Exemplary fruit trees of rosaceous plants include apples, Nashi pears, pears, cherries, *Prunus mume*, loquats, apricots, peaches, plums, and prunes. Exemplary fruit trees of vitaceous plants include grapes, *Vitis coignetiae*, and *Ampelopsis glandulosa* var. *heterophylla*. Exemplary fruit trees of ebenaceous plants include persimmons, *Diospyros lotus*, and *Diospyros rhombifolia*. Exemplary fruit trees of rutaceous plants include *Citrus unshiu*, kumquats, grapefruits, lemons, limes, yuzu, kabosu, sudachi, and *Citrus depressa*.

Of the types listed above, apples, Nashi pears, pears, cherries, grapes, persimmons, peaches and *Citrus unshiu* are particularly preferred.

Examples

The present invention is described below more specifically by way of examples (Tests 1 to 6). The materials, amounts of use, ratios, treatments, treatment procedures and the like illustrated in the examples below may be modified as appropriate as long as they do not depart from the scope and spirit of the present invention. Therefore, the scope of the present invention should not be construed as being limited to the following examples.

Note that the determination of grading in Tests 1 to 6 was all carried out by farmers proficient in plants subjected to the tests as well as in grading of those plants.

<Details of Test 1>

Test 1 was carried out in an agricultural field for cultivation of Nashi pears (variety: Hosui) in Inzai city, Chiba from October, 2017 to August, 2018 with the following separated areas.

Test area I: In the open-field culture, an agrochemical was diluted with nanobubble water generated using well water as source water by the method described below, and the diluted agrochemical was sprayed by a speed sprayer method.

Test area II: In the open-field culture, an agrochemical was diluted with non-nanobubble water (specifically, well water used as the source water of the nanobubble water in the test area I), and the diluted agrochemical was sprayed by the speed sprayer method.

The test areas I and II were situated side by side, and 50 Nashi pear trees were cultivated in each test area. In each test area, the number of times of spraying of the agrochemical was 18 times in total based on a disease and pest control calendar for Nashi pears, and the spraying was carried out at the same timing in those test areas. The amount of sprayed agrochemical in each time was adjusted to be substantially the same between those test areas, specifically adjusted to the amount consumed while a speed sprayer with a tank volume of 600 L was operated one time.

<Nanobubble Water Generation Method>

Nanobubble water was generated using an existing nanobubble generating apparatus (200 V, 10 L/min type; manufactured by Kakuichi Co., Ltd.) where bubbles (nanobubbles) were generated in water by a pressurized dissolution method.

Water used to generate nanobubble water was well water as described above, and the gas used to form bubbles was oxygen (industrial oxygen, oxygen concentration: 99 volt).

The conditions for generation of nanobubbles using the above nanobubble generating apparatus were as follows.

Number of bubbles per milliliter of water: $5\times10^9$ bubbles/mL

Size (modal particle size) of bubbles: 100 nm

Zeta potential of bubbles: −35 mV

<Quality Evaluation>

(1-1) Number of Excellent-Grade Products

For each test area, of the harvest number, the numbers of fruits falling under the Excellent category (Excellent-grade products), fruits falling under the Very Good category (Very Good-grade products), and fruits falling under the Good category (Good-grade products) in quality grade as well as the percentages thereof relative to the total number were obtained.

The evaluation results are shown below. The harvest numbers shown below are the number of shippable products, and the number of products that obviously should be discarded are not included in the harvest number below.

The harvest number in the test area I: 16,000
- The number of Excellent-grade products: 13,000 (81%)
- The number of Very Good-grade products: 2,400 (15%)
- The number of Good-grade products: 600 (4%)

The harvest number in the test area II: 15,500
- The number of Excellent-grade products: 9,000 (58%)
- The number of Very Good-grade products: 4,600 (30%)
- The number of Good-grade products: 1,900 (12%)

As described above, the percentage of Excellent-grade products is higher in the test area I than in the test area II, and it can be seen that the fruit quality improving effect was exhibited in the test area I.

Figure 2:
FIG. 2 is an image of Nashi pears cultivated in a test area I of Test 1.
Figure 3:
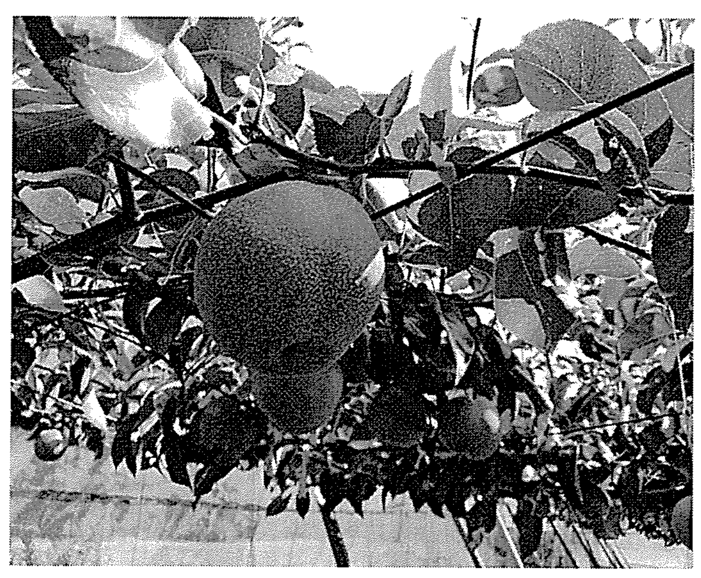
FIG. 3 is an image of Nashi pears cultivated in a test area II of Test 1.
Figure 4:
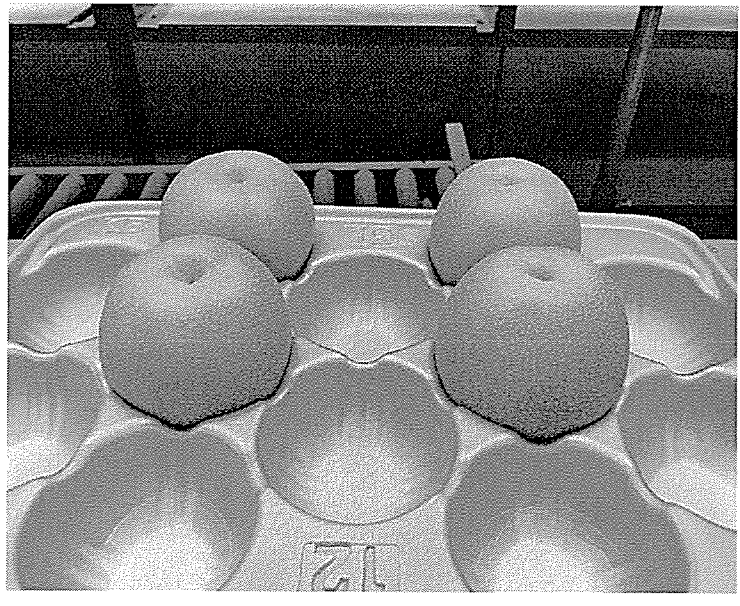
FIG. 4 is an image showing Nashi pears graded as Excellent (right) and Nashi pears graded as Very Good (left).

The fruit quality improving effect was already confirmed during the cultivation period; in the test area I, the shape of fruits during the fruit cluster enlargement period satisfied the shape standard of Excellent-grade products as shown in FIG. 2, whereas in the test area II, the shape of fruits during the fruit cluster enlargement period was out of the shape standard of Excellent-grade products as shown in FIG. 3. Note that the shape of Excellent-grade products (Nashi pears on the right side in FIG. 4) is more rounded than the shape of non-Excellent grade products, e.g., Very Good-grade products (Nashi pears on the left side in FIG. 4).

(1-2) Measurement of Sugar Content

For each test area, of harvested Nashi pears, nine samples of Excellent-grade products were randomly chosen, and the sugar contents of those samples were each measured with a sugar content meter. The measurement results and the average thereof for each test area are shown in Table 17 below.

TABLE 17

| | Sugar content of Excellent-grade product in test area I | Sugar content of Excellent-grade product in test area II |
|---|---|---|
| Measurement 1 | 14.9 | 14.5 |
| Measurement 2 | 14.6 | 13.6 |
| Measurement 3 | 13.6 | 14.8 |
| Measurement 4 | 15.7 | 14.1 |
| Measurement 5 | 15.4 | 13.4 |
| Measurement 6 | 13.4 | 15.0 |
| Measurement 7 | 15.0 | 14.6 |
| Measurement 8 | 14.8 | 14.0 |
| Measurement 9 | 14.5 | 14.1 |
| Average | 14.7 | 14.2 |

As evident from Table 17 above, the sugar contents of Excellent-grade products cultivated in the test area I are higher than those of Excellent-grade products cultivated in the test area II, and this revealed that the sugar content as the quality improved (increased) owing to the application of nanobubble water.

The results of Test 1 show that the fruit shape improved through the application of nanobubble water, and this confirmed that, as the quality of Nashi pears, the quality evaluated based on the appearance improves owing to nanobubble water. Furthermore, since the sugar content increased through the application of nanobubble water, this confirmed that, as the quality of Nashi pears, the quality evaluated based on the contained components improves owing to nanobubble water. It can be understood from the foregoing that for Nashi pears, the present invention comprehensively improves the quality in terms of the appearance, the contained components, the sensibilities and the like.

<Details of Test 2>

Test 2 was carried out in an agricultural field for cultivation of cherries (variety: Sato Nishiki) in Higashine city, Yamagata with the following separated areas.

Test area A1: In the open-field culture, an agrochemical was diluted with nanobubble water generated using well water as source water, and the diluted agrochemical was sprayed by the speed sprayer method.

Test area A2: In the open-field culture, an agrochemical was diluted with non-nanobubble water (specifically, well water used as the source water of the nanobubble water in the test area A1), and the diluted agrochemical was sprayed by the speed sprayer method.

The test areas A1 and A2 were situated side by side, and 25 cherry trees were cultivated in each test area. In each test area, the number of times of spraying of the agrochemical was 12 times in total based on a disease and pest control calendar for cherries, and the spraying was carried out at the same timing in those test areas. The amount of sprayed agrochemical in each time was adjusted to be substantially the same between those test areas, specifically adjusted to the amount consumed while a speed sprayer with a tank volume of 1000 L was operated one time.

Nanobubble water used in the test area A1 was generated under the same conditions as those for the nanobubble water used in the test area I of Test 1 by use of an existing nanobubble generating apparatus (100 V, 10 L/min type; manufactured by Kakuichi Co., Ltd.). The gas used in generation of nanobubble water was oxygen (industrial oxygen, oxygen concentration: 99 vol %).

<Quality Evaluation>

(2-1) Number of Excellent-Grade Products

In Test 2, none of harvested cherries fell under the Good category (Good-grade products), so that the harvested cherries were classified into either Excellent-grade products or Very Good-grade products, while products that obviously should be discarded were removed. Accordingly, for each test area, of the harvest number of cherries (the number of shippable products), the numbers of those falling under the Excellent category (Excellent-grade products) and those falling under the Very Good category (Very Good-grade products) in quality grade as well as the percentages thereof relative to the harvest number were obtained. The determination of grading was carried out not with the grade classifications for cherries shown in Table 2 described above but with the grade classifications shown in Table 18 below, specifically based on the colored area of a

TABLE 18

| | Excellent | Very Good | Good |
|---|---|---|---|
| Test 2 | Colored area of 70% or more | Colored area of 60% or more | Colored area of 50% or more |

The evaluation results are shown below.

The harvest number in the test area A1: 170,000

- The number of Excellent-grade products: 153,000 (90%)
- The number of Very Good-grade products: 17,000 (10%)

The harvest number in the test area A2: 160,000

- The number of Excellent-grade products: 120,000 (75%)
- The number of Very Good-grade products: 40,000 (25%)

As described above, the percentage of Excellent-grade products is higher in the test area A1 than in the test area A2, and it can be seen that the fruit quality improving effect of nanobubble water was exhibited in the test area A1. The fruit quality improving effect was already confirmed during the cultivation period; in the test area A1, the colored area in the stage immediately before harvesting (specifically, June 13) was larger than that in the test area A2.

Figure 5:
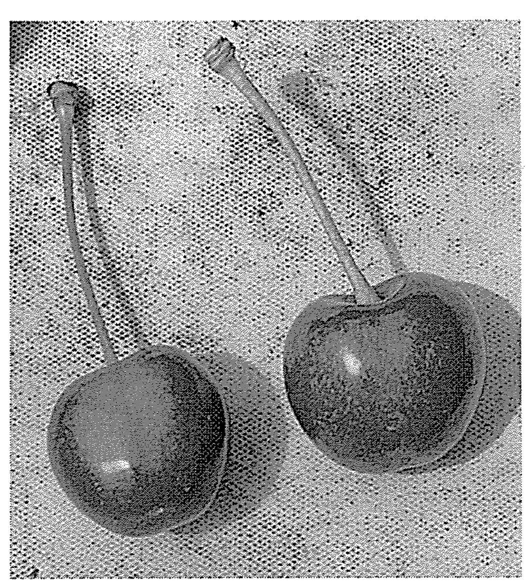
FIG. 5 is an image showing a cherry cultivated in a test area A1 of Test 2 (right) and a cherry cultivated in a test area A2 thereof (left).

Note that FIG. 5 shows cherries harvested in the respective test areas, that is, a fruit harvested in the test area A1 on the right side and a fruit harvested in the test area A2 on the left side in the figure. As evident from this figure, the one harvested in the test area A1 has a larger colored area than that harvested in the test area A2 even though the both are the Excellent-grade products.

(2-2) Measurement of Sugar Content

For each test area, of Excellent-grade products of harvested cherries, 10 samples having substantially same colored area and size were chosen, and the sugar contents of those samples were each measured with a sugar content meter. The measurement results and the average thereof for each test area are shown in Table 19 below.

TABLE 19

| | Sugar content of Excellent-grade product in test area A1 | Sugar content of Excellent-grade product in test area A2 |
|---|---|---|
| Measurement 1 | 18.1 | 18.2 |
| Measurement 2 | 18.6 | 18.0 |
| Measurement 3 | 18.6 | 18.7 |
| Measurement 4 | 18.0 | 18.9 |
| Measurement 5 | 19.7 | 18.5 |
| Measurement 6 | 19.6 | 17.7 |
| Measurement 7 | 18.7 | 17.9 |
| Measurement 8 | 18.5 | 17.6 |
| Measurement 9 | 20.5 | 18.0 |
| Measurement 10 | 18.8 | 18.5 |
| Average | 18.91 | 18.20 |

As evident from Table 19 above, the sugar contents of cherries cultivated in the test area A1 are higher than those of cherries cultivated in the test area A2, and this revealed that the sugar content as the quality improved (increased) owing to the application of nanobubble water.

The results of Test 2 show that the colored area increased through the application of nanobubble water, and this confirmed that, as the quality of cherries, the quality evaluated based on the appearance improves owing to nanobubble water. Furthermore, since the sugar content increased through the application of nanobubble water, this confirmed that, as the quality of cherries, the quality evaluated based on the contained components improves owing to nanobubble water. It can be understood from the foregoing that for cherries, the present invention comprehensively improves the quality in terms of the appearance, the contained components, the sensibilities and the like.

<Details of Test 3>

Test 3 was carried out in an agricultural field for cultivation of grapes (variety: Shine Muscat) in Nirasaki city, Yamanashi with the following separated areas.

Test area B1: In the open-field culture, an agrochemical was diluted with nanobubble water generated using agricultural water as source water, and the diluted agrochemical was sprayed by the speed sprayer method.

Test area B2: In the open-field culture, an agrochemical was diluted with non-nanobubble water (specifically, agricultural water used as the source water of the nanobubble water in the test area B1), and the diluted agrochemical was sprayed by the speed sprayer method.

The test areas B1 and B2 were situated side by side, where 15 grape trees were cultivated in the test area B1 and 10 grape trees were cultivated in the test area B2. In each test area, the number of times of spraying of the agrochemical was nine times in total based on a disease and pest control calendar for grapes, and the spraying was carried out at the same timing in those test areas. The way of spraying the agrochemical in each test area and the conditions for generation of the nanobubble water used in the test area B1 are the same as those in Test 2.

<Quality Evaluation>

(3-1) Number of Excellent-Grade Products

For each test area, a shippable grape cluster was randomly chosen from the harvested clusters, and of a predetermined number of grapes picked from the chosen cluster, the numbers of those falling under the Excellent category (Excellent-grade products), those falling under the Very Good category (Very Good-grade products), and those falling under the Good category (Good-grade products) in quality grade as well as the percentages thereof relative to the total number of the picked grapes were obtained.

The determination of grading into Excellent, Very Good and Good products was carried out not with the grade classifications for Shine Muscat shown in Table 7 described above but with the grade classifications shown in Table 20 below, specifically based on the sugar content, the presence or absence of blemishes and marks of rubbing, and the weight of one grape. For the sugar content, the standard for shipping was specified to 17 degrees, and it was determined whether a grape satisfied this standard for shipping or not.

TABLE 20

| | Excellent | Very Good | Good |
|---|---|---|---|
| Test 3 | Sugar content of 17 degrees or more<br>No blemish and no mark of rubbing<br>Weight of one grape of 10 g or more | Sugar content of 17 degrees or more<br>No blemish and no mark of rubbing<br>Weight of one grape: The second best level following Excellent | Sugar content of 17 degrees or more<br>Slightly having blemishes and marks of rubbing<br>Weight of one grape: The third best level following Very Good |

The evaluation results are shown below.

The harvest number in the test area B1: 1,500
- The number of Excellent-grade products: 1,200 (80%)
- The number of Very Good-grade products: 300 (20%)
- The number of Good-grade products: 0 (0%)

The harvest number in the test area B2: 1,000
- The number of Excellent-grade products: 700 (70%)
- The number of Very Good-grade products: 200 (20%)
- The number of Good-grade products: 100 (10%)

As described above, the percentage of Excellent-grade products is higher in the test area B1 than in the test area B2, and it can be seen that the fruit quality improving effect of nanobubble water was exhibited in the test area B1. Note that for each test area, given five clusters were chosen, and two grapes from the top of each of the clusters, that is, ten grapes in total were measured in weight. As a result, the weight was 90 g in the test area B1 and 85 g in the test area B2.

(3-2) Measurement of Sugar Content

For each test area, 10 samples were randomly chosen from harvested Excellent-grade grapes, and the sugar contents of those samples (the sugar contents at the time before shipping) were each measured with a non-destructive type sugar content meter. The measurement results and the average thereof for each test area are shown in Table 21 below.

TABLE 21

| | Sugar content of Excellent-grade product in test area B1 | Sugar content of Excellent-grade product in test area B2 |
|---|---|---|
| Measurement 1 | 17.2 | 17.3 |
| Measurement 2 | 16.2 | 17.3 |
| Measurement 3 | 17.6 | 11.0 |
| Measurement 4 | 16.9 | 15.7 |
| Measurement 5 | 16.4 | 15.7 |
| Measurement 6 | 16.4 | 15.2 |
| Measurement 7 | 19.0 | 15.7 |
| Measurement 8 | 19.6 | 14.3 |
| Measurement 9 | 16.8 | 16.0 |
| Measurement 10 | 16.9 | 14.4 |
| Average | 17.30 | 15.26 |

As evident from Table 21 above, the sugar contents of grapes cultivated in the test area B1 are higher than those of grapes cultivated in the test area B2, and this revealed that the sugar content as the quality improved (increased) owing to the application of nanobubble water.

The results of Test 3 show that the number of grapes with no blemish or mark of rubbing increased through the application of nanobubble water, and this confirmed that, as the quality of grapes, the quality evaluated based on the appearance improves owing to nanobubble water. Furthermore, since the sugar content increased through the application of nanobubble water, this confirmed that, as the quality of grapes, the quality evaluated based on the contained components improves owing to nanobubble water. It can be understood from the foregoing that for grapes, the present invention comprehensively improves the quality in terms of the appearance, the contained components, the sensibilities and the like.

<Details of Test 4>

Test 4 was carried out in an agricultural field for cultivation of peaches (variety: Ichinomiya Suimitsu) in Higashine city, Yamagata with the following separated areas.

Test area C1: In the open-field culture, an agrochemical was diluted with nanobubble water generated using well water as source water, and the diluted agrochemical was sprayed by the speed sprayer method.

Test area C2: In the open-field culture, an agrochemical was diluted with non-nanobubble water (specifically, well water used as the source water of the nanobubble water in the test area C1), and the diluted agrochemical was sprayed by the speed sprayer method.

The test areas C1 and C2 were situated side by side, and three peach trees were cultivated in each test area. In each test area, the number of times of spraying of the agrochemical was 11 times in total based on a disease and pest control calendar for peaches, and the spraying was carried out at the same timing in those test areas. The way of spraying the agrochemical in each test area and the conditions for generation of the nanobubble water used in the test area C1 are the same as those in Test 2.

<Quality Evaluation>

(4-1) Number of Excellent-Grade Products

For each test area, of the harvested peaches, the numbers of those falling under the Excellent category and those falling under the Very Good category in quality grade and the other ones (products to be discarded) as well as the percentages thereof relative to the harvest number were obtained. Not the grade classifications for peaches shown in Tables 8 to 10 described above but different grade classifications shown in Table 22 below were employed to determine as to whether a peach corresponds to the Excellent-grade product or the Very Good-grade product. Products to be discarded are ones damaged by diseases or pests or having remarkable blemishes in their appearance.

TABLE 22

| | | Excellent | Very Good |
|---|---|---|---|
| Test 4 | Fruit of different variety | Not mixed | Same as the left |
| | Rotten and deteriorating fruit | Not mixed | Same as the left |
| | Shape | Having characteristics of the variety and most excellent | Having characteristics of the variety and very good |
| | Color and gloss | Having excellent variety-specific color and gloss | Having very good variety-specific color and gloss |
| | Ripeness | Having highly uniform ripeness (unripe and overripe fruits excluded) | Having uniform ripeness (unripe and overripe fruits excluded) |
| | Uniformity | Ones meeting a predetermined standard and highly uniform in size | Same as the left |
| | Damage caused by diseases or pests | Ones not damaged by Monilinia fructicola or the like, with other damage caused by diseases or pests being only in fruit skin and hardly present | Ones not damaged by Monilinia fructicola or the like, with other damage caused by diseases or pests being only in fruit skin and not noticeable |
| | Pit split | One with pit split being hardly recognizable from the appearance | One with pit split being unnoticeable from the appearance |
| | Sunburn | No sunburn | Not noticeable |
| | blemish damage | Having no fresh blemish or no blemish due to pressing, with other blemish damage being unnoticeable if present | Having no fresh blemish or no blemish due to pressing, with other blemish damage not greatly impairing the appearance if present |
| | Other deficiencies | Almost no deficiencies | Not impairing the apparance |

The evaluation results are shown below.

The harvest number in the test area C1: 550

The number of Excellent-grade products: 510 (93%)

The number of products to be discarded: 40 (7%)

The harvest number in the test area C2: 510

The number of Excellent-grade products: 390 (76%)

The number of products to be discarded: 120 (24%)

Figure 6:
FIG. 6 is an image showing a peach tree cultivated in a test area C2 of Test 4, especially leaves of the peach tree affected with a peach shot hole disease.

As described above, the percentage of Excellent-grade products is higher in the test area C1 than in the test area C2, and it can be seen that the fruit quality improving effect of nanobubble water was exhibited in the test area C1. The fruit quality improving effect was already confirmed during the cultivation period; in the test area C2, there was seen a disease (peach shot hole disease) causing browned portions which in turn form holes in a leaf as shown in FIG. 6, whereas occurrence of such a disease was minimized in the test area C1, resulting in excellent fruition.

(4-2) Measurement of Sugar Content

For each test area, of Excellent-grade products of harvested peaches, six samples were randomly chosen, and the sugar contents thereof were each measured. The measurement results and the average thereof for each test area are shown in Table 23 below.

TABLE 23

| | Sugar content of Excellent-grade product in test area C1 | Sugar content of Excellent-grade product in test area C2 |
|---|---|---|
| Measurement 1 | 15.4 | 11.4 |
| Measurement 2 | 14.4 | 10.8 |
| Measurement 3 | 14.1 | 12.0 |
| Measurement 4 | 13.8 | 11.3 |
| Measurement 5 | 14.9 | 11.5 |
| Measurement 6 | 13.3 | 11.4 |
| Average | 14.32 | 11.40 |

As evident from Table 23 above, the sugar contents of peaches cultivated in the test area C1 are higher than those of peaches cultivated in the test area C2, and this revealed that the sugar content as the quality improved (increased) owing to the application of nanobubble water.

The results of Test 4 show that the shape and the color and gloss of fruits, and the presence or absence of damage caused by diseases or pests improved through the application of nanobubble water, and this confirmed that, as the quality of peaches, the quality evaluated based on the appearance improves owing to nanobubble water. Furthermore, since the sugar content increased through the application of nanobubble water, this confirmed that, as the quality of peaches, the quality evaluated based on the contained components improves owing to nanobubble water. It can be understood from the foregoing that for peaches, the present invention comprehensively improves the quality in terms of the appearance, the contained components, the sensibilities and the like.

<Details of Test 5>

Test 5 was carried out in an agricultural field for cultivation of pears (variety: La France) in Higashine city, Yamagata with the following separated areas.

Test area D1: In the open-field culture, an agrochemical was diluted with nanobubble water generated using well water as source water, and the diluted agrochemical was sprayed by the speed sprayer method.

Test area D2: In the open-field culture, an agrochemical was diluted with non-nanobubble water (specifically, well water used as the source water of the nanobubble water in the test area D1), and the diluted agrochemical was sprayed by the speed sprayer method.

The test areas D1 and D2 were situated side by side, and 20 pear trees were cultivated in each test area. In each test area, the number of times of spraying of the agrochemical was 16 times in total based on a disease and pest control calendar for pears, and the spraying was carried out at the same timing in those test areas. The way of spraying the agrochemical in each test area and the conditions for generation of the nanobubble water used in the test area D1 are the same as those in Test 2.

<Quality Evaluation>

(5-1) Number of Excellent-Grade Products

For each test area, the harvested pears were classified into the grade classifications including products falling under the Excellent category (Excellent-grade products) in quality grade, products with the size smaller than that of the Excellent-grade products and having a few blemishes (products to be processed), and the other products (products to be discarded); and the numbers of the products of the respective grades and the percentages thereof relative to the harvest number were obtained. Products to be discarded are ones damaged by diseases or pests or having remarkable blemishes in their appearance.

The evaluation results are shown below.

The harvest number in the test area D1: 13,000

The number of Excellent-grade products: 12,300 (94%)

The number of products to be processed: 500 (4%)

The number of products to be discarded: 200 (2%)

The harvest number in the test area D2: 10,000

The number of Excellent-grade products: 10,000 (84%)

The number of products to be processed: 1,000 (8%)

The number of products to be discarded: 1,000 (8%)

Figure 7:
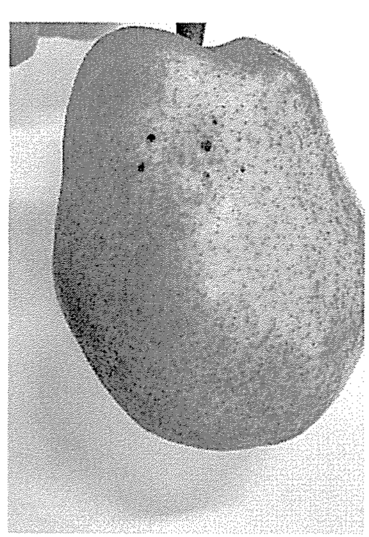
FIG. 7 is an image showing, of pears cultivated in a test area D2 of Test 5, a pear damaged by a pest.

As described above, the percentage of Excellent-grade products is higher in the test area D1 than in the test area D2, and it can be seen that the fruit quality improving effect of nanobubble water was exhibited in the test area D1. That is, in the test area D2, damage caused by pests was seen on fruits as shown in FIG. 7, whereas in the test area D1, pests were controlled, so that the number of fruits corresponding to the Excellent-grade product increased as shown in the foregoing. In addition, for each test area, 10 pears (which correspond to the Excellent product or the product to be processed) were randomly chosen, and the weights thereof were measured to obtain the average. The average was 296.3 g in the test area D1 and 282.2 g in the test area D2.

(5-2) Measurement of Sugar Content

For each test area, of Excellent-grade products of harvested pears, 10 samples were randomly chosen, and the sugar contents thereof were each measured. The sugar content was measured at the time (October 30) after a storage period (normally, about two to three weeks) has passed from the harvest date (October 14).

The measurement results and the average thereof for each test area are shown in Table 24 below.

TABLE 24

| | Sugar content of Excellent-grade product in test area D1 | Sugar content of Excellent-grade product in test area D2 |
|---|---|---|
| Measurement 1 | 14.5 | 15.3 |
| Measurement 2 | 15.3 | 13.4 |
| Measurement 3 | 15.0 | 14.0 |
| Measurement 4 | 15.3 | 13.5 |
| Measurement 5 | 15.4 | 14.1 |
| Measurement 6 | 15.3 | 13.7 |

TABLE 24-continued

| | Sugar content of Excellent-grade product in test area D1 | Sugar content of Excellent-grade product in test area D2 |
|---|---|---|
| Measurement 7 | 15.4 | 12.8 |
| Measurement 8 | 14.1 | 15.4 |
| Measurement 9 | 15.1 | 14.1 |
| Measurement 10 | 15.5 | 13.8 |
| Average | 15.09 | 14.01 |

As evident from Table 24 above, the sugar contents of pears cultivated in the test area D1 are higher than those of pears cultivated in the test area D2, and this revealed that the sugar content as the quality improved (increased) owing to the application of nanobubble water.

The results of Test 5 show that the presence or absence of blemishes, damage caused by diseases or pests, and the like improved through the application of nanobubble water, and this confirmed that, as the quality of pears, the quality evaluated based on the appearance improves owing to nanobubble water. Furthermore, since the sugar content increased through the application of nanobubble water, this confirmed that, as the quality of pears, the quality evaluated based on the contained components improves owing to nanobubble water. It can be understood from the foregoing that for pears, the present invention comprehensively improves the quality in terms of the appearance, the contained components, the sensibilities and the like.

<Details of Test 6>

Test 6 was carried out in an agricultural field for cultivation of apples (variety: Fuji) in Nagano city, Nagano with the following separated areas.

Test area E1: In the open-field culture, an agrochemical was diluted with nanobubble water generated using tap water as source water, and the diluted agrochemical was sprayed by the speed sprayer method.

Test area E2: In the open-field culture, an agrochemical was diluted with non-nanobubble water (specifically, tap water used as the source water of the nanobubble water in the test area E1), and the diluted agrochemical was sprayed by the speed sprayer method.

The test areas E1 and E2 were situated side by side, where 35 apple trees were cultivated in the test area E1 and 140 apple trees were cultivated in the test area E2. In each test area, the number of times of spraying of the agrochemical was 10 times in total based on a disease and pest control calendar for apples, and the spraying was carried out at the same timing in those test areas. The way of spraying the agrochemical in each test area and the conditions for generation of the nanobubble water used in the test area E1 are the same as those in Test 2.

<Quality Evaluation>

(6-1) Number of Excellent-Grade Products

For each test area, of the harvest number of apples (the number of shippable products), the numbers of those falling under the Excellent category (Excellent-grade products), those falling under the Very Good category (Very Good-grade products) and those falling under the Good category (Good-grade products) in quality grade as well as the percentages thereof relative to the harvest number were obtained. The determination of grading was carried out according to the classifications specified in Table 11 described above, specifically with the classifications shown in Table 25 below, based mainly on the shape and the color of a fruit.

TABLE 25

| | Excellent | Very Good | Good |
|---|---|---|---|
| Test 6 | Having excellent variety-specific shape Having the color and gloss percentage at or above the standard value and taking on excellent ripe color | Having very good variety-specific shape Having the color and gloss percentage at or above the standard value and taking on excellent ripe color | Having the shape at the third best level following Very Good Having the color and gloss percentage at or above the standard value and taking on the third best ripe color following Very Good |

The evaluation results are shown below.

The harvest number in the test area E1: 42,000

The number of Excellent-grade products: 18,900 (45%)

The number of Very Good-grade products: 21,000 (50%)

The number of Good-grade products: 2,100 (5%)

The harvest number in the test area E2: 160,000

The number of Excellent-grade products: 56,000 (35%)

The number of Very Good-grade products: 88,000 (55%)

The number of Good-grade products: 16,000 (10%)

As described above, the percentage of Excellent-grade products is higher in the test area E1 than in the test area E2, and it can be seen that the fruit quality improving effect of nanobubble water was exhibited in the test area E2.

(6-2) Measurement of Sugar Content

For each test area, of Excellent-grade products of harvested apples, 12 samples were randomly chosen, and the sugar contents thereof were each measured with a sugar content meter. The measurement results and the average thereof for each test area are shown in Table 26 below.

TABLE 26

| | Sugar content of Excellent-grade product in test area E1 | Sugar content of Excellent-grade product in test area E2 |
|---|---|---|
| Measurement 1 | 16.7 | 17.6 |
| Measurement 2 | 17.2 | 16.2 |
| Measurement 3 | 16.1 | 15.5 |
| Measurement 4 | 18.6 | 16.6 |
| Measurement 5 | 16.1 | 17.2 |
| Measurement 6 | 18.6 | 15.9 |
| Measurement 7 | 16.1 | 19.1 |
| Measurement 8 | 17.8 | 16.4 |
| Measurement 9 | 16.3 | 16.8 |
| Measurement 10 | 18.4 | 16.7 |
| Measurement 11 | 17.9 | 15.6 |
| Measurement 12 | 17.9 | 16.0 |
| Average | 17.31 | 16.63 |

As evident from Table 26 above, the sugar contents of apples cultivated in the test area E1 are higher than those of apples cultivated in the test area E2, and this revealed that the sugar content as the quality improved (increased) owing to the application of nanobubble water.

The results of Test 6 show that the shape and the color and gloss of fruits improved through the application of nanobubble water, and this confirmed that, as the quality of apples, the quality evaluated based on the appearance improves owing to nanobubble water. Furthermore, since the sugar content increased through the application of nanobubble water, this confirmed that, as the quality of apples, the quality evaluated based on the contained components improves owing to nanobubble water. It can be understood from the foregoing that for apples, the present invention comprehensively improves the quality in terms of the appearance, the contained components, sensibilities and the like.

REFERENCE SIGNS LIST

10 nanobubble generating apparatus
30 liquid discharger
40 gas incorporating device
41 vessel
42 gas incorporating device body
50 nanobubble generating nozzle

The invention claimed is:

1. A method for producing fruits having improved quality, the method comprising applying nanobubble water to a plant belonging to fruit trees by spraying an agrochemical diluted with the nanobubble water over leaves of the plant, the plant being planted to soil, wherein the nanobubble water is applied at least one time during a fruit cluster enlargement period of the plant, wherein bubbles contained in the nanobubble water include at least one gas selected from the group consisting of oxygen, nitrogen, and carbon dioxide, and wherein the nanobubble water contains bubbles in an amount of $1\times10^8$ to $1\times10^{10}$ bubbles/ml.

2. The method for producing fruits having improved quality according to claim 1, wherein the nanobubble water contains bubbles with a modal particle size of 10 to 500 nm.

3. The method for producing fruits having improved quality according to claim 1, wherein the nanobubble water contains bubbles with a zeta potential of −50 mV to −30 mV.

4. The method for producing fruits having improved quality according to claim 1, wherein the nanobubble water is applied to the plant plural times.

5. The method for producing fruits having improved quality according to claim 1, wherein the plant is a rosaceous plant, a vitaceous plant, an ebenaceous plant or a rutaceous plant.

6. The method for producing fruits having improved quality according to claim 1, wherein the plant is an apple, a Nashi pear, a pear, a cherry, a grape, a persimmon, a peach or *Citrus unshiu.*

7. The method for producing fruits having improved quality according to claim 1, wherein as quality of a fruit, a sugar content of the fruit is improved.

8. The method for producing fruits having improved quality according to claim 1, wherein in cases where fruits are graded into plural grades according to quality, and wherein the nanobubble water is applied to the plant to increase a percentage of fruits falling under a high grade category among the plural grades of quality.

9. The method for producing fruits having improved quality according to claim 5, wherein as quality of a fruit, a sugar content of the fruit is improved.

10. The method for producing fruits having improved quality according to claim 5, wherein in cases where fruits are graded into plural grades according to quality, and wherein the nanobubble water is applied to the plant to increase a percentage of fruits falling under a high grade category among the plural grades of quality.

11. The method for producing fruits having improved quality according to claim 6, wherein as quality of a fruit, a sugar content of the fruit is improved.

12. The method for producing fruits having improved quality according to claim 6, wherein in cases where fruits are graded into plural grades according to quality, the nanobubble water is applied to the plant to increase a percentage of fruits falling under a high grade category among the plural grades of quality.

* * * * *